Patented Oct. 3, 1939

2,174,883

UNITED STATES PATENT OFFICE 2,174,883

TREATMENT OF HYDROCARBONS

Vladimir Ipatieff and Herman Pines, Chicago, Ill., assignors to Universal Oil Products Company, Chicago, Ill., a corporation of Delaware No Drawing. Application October 5, 1936, Serial No. 104,062

6 Claims. (Cl. 260—676)

This invention relates particularly to the treatment of paraffin hydrocarbons which are gaseous at ordinary temperatures and pressures, and particularly isobutane.

In a more specific sense, the invention is concerned with a novel process for alkylating isobutane with olefins which are normally gaseous to produce saturated hydrocarbons of higher molecular weight which can be utilized as constituents of motor fuel for automobile and aeroplane engines.

The cracking process, which is operated principally with the object of producing gasoline from heavier and less valuable petroleum fractions, incidentally produces considerable yields of fixed gases comprising hydrogen, methane, ethane, propane, and butanes, as well as ethylene, propylene and butylenes in varying quantities and proportions. In most instances these gases are considered to have merely a fuel value, though attempts are made from time to time to utilize the olefinic constituents for the manufacture of hydrocarbon derivatives on a commercial basis. On one application of the present process the isobutane and ethylene present in cracked gas mixtures are utilized as a source of additional yields of motor fuel fractions to augment those primarily produced by the cracking operation. While the process is particularly applicable to the utilization of the hydrocarbons in cracked gas mixtures and particularly selected fractions produced therefrom in the stabilizers of cracking plants, it is also applicable to the treatment of isobutane and ethylene produced from any other source.

In one specific embodiment the present invention comprises the alkylation of isobutane with ethylene at temperatures below 40° C. with catalysts comprising aluminum chloride and hydrogen chloride.

In a preferred embodiment of the invention the desired alkylation reactions are activated or accelerated by the presence of small quantities of olefins more reactive than ethylene which may be added continuously during a run or used to treat the catalyst prior to its use in the alkylation reactions with ethylene. This point will be developed in greater detail in a later portion of the specification.

An essential feature of the present invention is the utilization of sufficiently low temperatures of treatment so that the ordinarily vigorous action of aluminum chloride in catalyzing polymerization reactions among olefin hydrocarbons is moderated and reactions of alkylation occur rather than simple polymerization of the olefin involved. In other words, at the relatively low temperatures employed the rate of the polymerization reactions is reduced while apparently the rate of the alkylation reactions is not reduced to the same extent so that alkylation takes place in preference to polymerization.

The total reactions occurring when isobutane is alkylated with an olefin such as ethylene within the preferred range of conditions will necessarily involve to some extent not only simple alkylation corresponding to the addition of one or more molecules of the olefin to the isoparaffin, but also some reactions of polymerization and some reactions of decomposition, so that the net result is the production of a mixture of hydrocarbons having a considerable boiling range but still containing a major proportion of mono- and di-alkylated products, as will be shown in a later example.

The process may be conducted in several different ways, in which the main reacting constituents are in some cases essentially in liquid phase, in other cases in mixed phase, and in still other instances entirely in gaseous phase. When using the preferred low temperatures, however, the best procedure is to introduce the precooled ethylene into liquid isobutane in which aluminum chloride is suspended by mechanical agitating means. In batch operations involving substantially only the pure compounds, the amount of anhydrous aluminum chloride necessary is usually less than 10% by weight of the reacting constituents and the necessary amount of hydrogen chloride is still smaller and of the order of 1% by weight. Since ethylene as the base member of the olefin series is the least reactive in alkylation reactions of the present character, it has been found advisable and is included as a feature of the present invention to add a small percentage of a more reactive member of the olefin series such as propylene or one of the butylenes either to the aluminum chloride-isobutane mixture prior to the introduction of ethylene or continuously in admixture with ethylene and hydrogen chloride. After a treatment is completed the aluminum chloride layer is allowed to settle, and the upper hydrocarbon layer is removed by decantation and subjected to fractionation for the removal of uncombined hydrocarbons as a light overhead and the recovery of an intermediate motor fuel fraction.

The pronounced effect of preliminary or concurrent activation upon the speed of subsequent alkylation reactions with ethylene is somewhat difficult to explain on a theoretical basis though it may be suggested that intermediate hydrocarbon-aluminum chloride addition compounds are formed which are the real catalysts of the reaction in the presence of the hydrogen chloride which is continuously added. It is further possible that a certain amount of more reactive olefin tends to alkylate the isobutane and evolve considerable energy of reaction which has the effect of energizing the less reactive ethylene. It has been observed that the activating effect is gradually lost so that in a strict sense it is not entirely catalytic. This feature of the present process is important from a practical standpoint since when using pure ethylene or at least ethylene free from other olefins the speed of the alkylation reactions is sometimes below a practical level at the temperatures necessary to prevent polymerization. The preliminary treatment of granular aluminum chloride with relatively highly reactive olefins such as isobutylene or normal butylenes has been observed to have a still further effect of practical significance in that there is a greatly decreased tendency for the chloride particles to become very finely divided under vigorous agitation but rather to maintain their original size which prevents the carrying off of the catalyst in colloidal suspension in continuous processes.

In one type of operation liquid isobutane containing suspended therein the requisite amount of aluminum chloride and maintained at a suitably low temperature may be pumped through a tubular treater at the entrance to which it receives the necessary addition of ethylene and hydrogen chloride, the desired alkylation taking place during passage through the treater and the separation of the products being accomplished in a subsequent fractionator. The details of continuous processes of this general character are more or less familiar to those skilled in oil refinery operations and any necessary addition to or modifications of the above general procedures will be more or less obvious, and can be made without departing from the general scope of the invention.

The reacting hydrocarbons required for the present process may be obtained from any convenient source though as a rule the best sources are the cracked gas mixtures produced in the pyrolysis of heavy oils with the primary object of producing gasoline. The technique of hydrocarbon fractionation is sufficiently developed at the present time so that it is commercially feasible to produce relatively pure ethylene and isobutane by this method. A method which may be employed to obtain ethylene which is not contaminated with paraffin hydrocarbons consists in the use of solvents which selectively abstract olefins from the gas mixtures, the olefins being then separately fractionated. In such a process the residual unabsorbed paraffin mixture may be employed as the source of the required isobutane. Ethylene may also be prepared by the selective catalytic dehydrogenation of ethane or gas mixtures containing this compound in large percentage.

Over the preferred low temperature conditions of operation and in the presence of an excess of isobutane one molecule of ethylene tends to react with its molecular equivalent of isobutane while the excess of isobutane remains unaffected. When more ethylene is used than corresponds to about one mole of ethylene to three moles of isobutane there is an increased tendency for polymerization reactions to occur in preference to alkylation reactions. This is to be expected to some extent on account of the readiness with which ethylene alone is polymerized by aluminum chloride. However, by maintaining the proper excess of the paraffin hydrocarbon the course of the reactions may be kept principally in the direction of production of alkylated products of a saturated rather than an olefinic character. In order to balance up any disproportionation on the side of either the olefin or the paraffin, to produce products of the desired degree of alkylation either may be added from outside sources to produce a mixture of proper proportions. It will be shown in subsequent examples that there is some production of octanes and decanes as well as hexanes, the former compounds corresponding to alkylation of isobutane by two and three ethyl groups respectively.

The process may be utilized for the direct improvement of low antiknock value gasolines by suspending aluminum chloride therein at the required low temperatures and passing a proportioned mixture of isobutane and ethylene into the suspension along with a trace of hydrogen chloride. The gasoline functions both as a solvent and a reaction medium and the alkylation products are formed and blended with the gasoline at the same time to increase its antiknock value to an extent depending upon the amount of alkylated products formed.

The following example is given as illustrative of the type of results normally obtainable by the use of the present process, although it is not given with the intention of limiting the scope of the invention in exact conformity with the data presented.

25 parts by weight of granular anhydrous aluminum chloride was placed in a reaction vessel which could be operated under pressure and activated by adding 75 parts by weight of a mixture of isobutane and propylene in the weight ratio of three to one, respectively. 300 parts by weight of liquid isobutane was then added, the temperature of the reaction vessel was maintained at about 28° C. by an exterior regulating bath and ethylene was introduced at the rate of about one cubic foot per hour for a period of four hours, during which a maximum pressure of 230 pounds per square inch was developed. Hydrogen chloride was continuously added along with the ethylene in about 1% by weight thereof.

After releasing the gases and vaporous constituents the supernatant hydrocarbon liquid above the aluminum chloride sludge was decanted and fractionated, and it was found that on a basis of the isobutane added approximately 95% of the recovered liquid consisted of hydrocarbons boiling below 225° C. and 80% boiling below 150° C. The liquid products consisted of 25% hexane and approximately 20% each of octanes and decanes. The octane number of the fraction boiling below 150° C. was 87 by the motor method.

We claim as our invention:

1. A process for producing alkyl derivatives of isobutane which comprises alkylating isobutane with ethylene at an alkylating temperature below 40° C. and in the presence of aluminum chloride and hydrogen chloride, there being present during the reaction a molecular excess of isobutane over ethylene and the alkylation reaction being activated by means of a relatively small amount of an olefin of greater reactivity than ethylene.

2. The process as defined in claim 1 further characterized in that the aluminum chloride is treated with said olefin prior to the alkylation reaction.

3. The process as defined in claim 1 further characterized in that said olefin is continuously introducing during the reaction.

4. The process as defined in claim 1 further characterized in that said olefin comprises propylene.

5. The process as defined in claim 1 further characterized in that said olefin comprises a normal butylene.

6. The process as defined in claim 1 further characterized in that said olefin comprises isobutylene.

VLADIMIR IPATIEFF.
HERMAN PINES.